Nov. 22, 1955　　　N. G. A. MALMQUIST　　　2,724,586
RUBBER BLOCKS FOR RESILIENT WHEELS, RESILIENT
SHAFT COUPLINGS AND THE LIKE
Filed May 10, 1954　　　　　　　　　　　2 Sheets-Sheet 1

INVENTOR
NILS G. A. MALMQUIST
BY
*Henderath, Lind & Ponack*
*Attorneys*

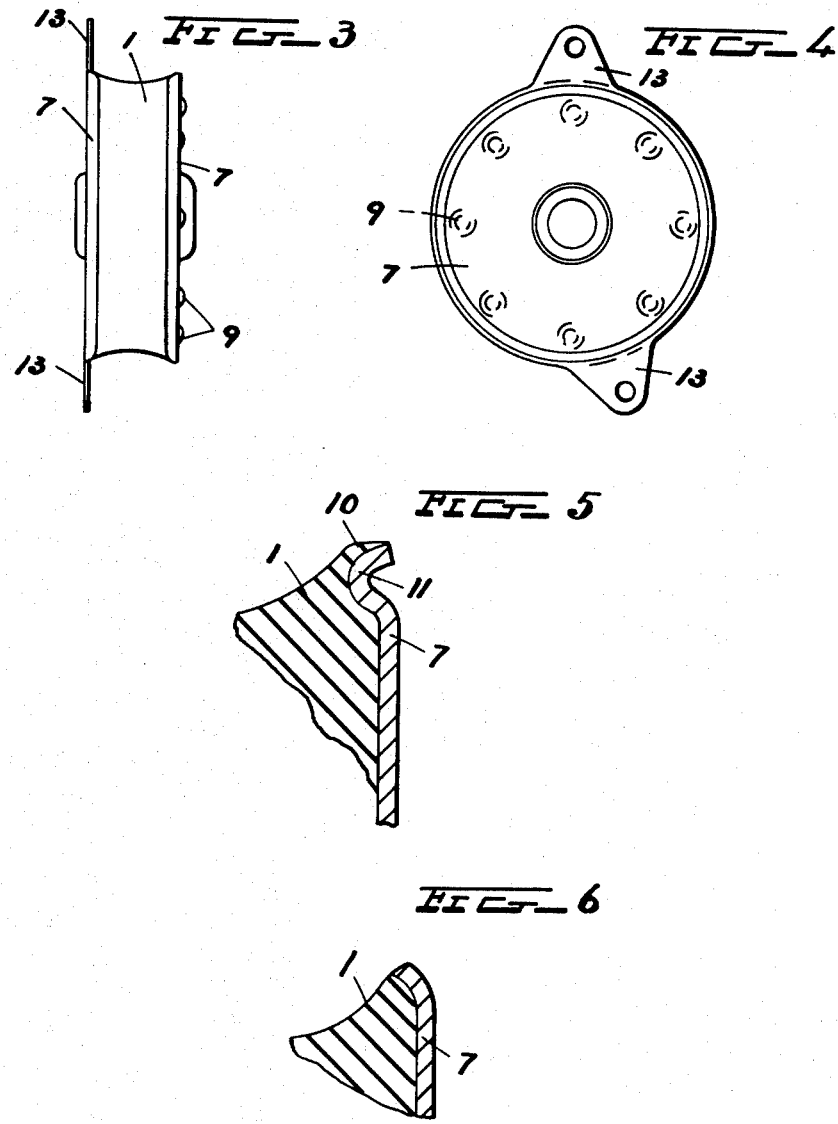

ns Patent Office 2,724,586
Patented Nov. 22, 1955

2,724,586

RUBBER BLOCKS FOR RESILIENT WHEELS, RESILIENT SHAFT COUPLINGS AND THE LIKE

Nils Gunnar August Malmquist, Malmo, Sweden, assignor to Svenska Aktiebolaget Bromsregulator, Malmo, Sweden, a corporation of Sweden Application May 10, 1954, Serial No. 428,600

Claims priority, application Sweden May 13, 1953

1 Claim. (Cl. 267—1)

This invention relates to rubber blocks for use as resilient elements in resilient wheels, resilient shaft couplings and the like.

There is a great variety of designs of resilient wheels, resilient shaft couplings and the like, all having in common that they include relatively movable parts resiliently interconnected by means of rubber blocks clamped between the relatively movable parts and covered on their surfaces facing said parts with sheets of metal or other relatively hard material adherently attached to the rubber blocks by vulcanization. Usually said rubber blocks are of circular or segment-shaped cross section and distributed around the axis of the wheel or coupling, or they are annular and disposed coaxially with the wheel or coupling.

On using rubber blocks as resilient elements clamped between the relatively movable parts of resilient vehicle wheels, e. g. railway vehicle wheels, resilient shaft couplings and the like in which the rubber blocks have to transmit stresses of varying size or direction or both, which can attain high values, the greatest problem met with is that of making the rubber blocks withstand said stresses, that is to say ensuring them a practically and economically satisfactory life. The usual sheet metal discs on the surfaces of the rubber blocks facing the relatively movable parts between which the rubber blocks are clamped serve inter alia the purpose of protecting the rubber against a rapid deterioration by safeguarding the rubber from contact with and ensuing rubbing against the relatively movable parts between which the rubber blocks are clamped. However, it has proved that a beginning and then gradually increasing deterioration of the rubber can often be observed rather soon at the edges of the surfaces of the rubber blocks covered with the sheet metal discs. Judging by experiments on which the present invention is founded, the rubber deterioration thus occurring is primarily caused by the rubber being readily torn loose from the sheet metal discs just at their edges as a result of tensile stresses arising there. The invention has for its object to eliminate or suppress the arising of stresses on the rubber where joining the marginal portions of the sheet metal discs, and consequently the tendency of the rubber to be torn loose there. It has been found that this object can be attained by the marginal portions of the sheet metal discs and the adjoining portions of the rubber being given special shapes.

The above and further objects and features of the invention will become apparent from the following description, reference being had to the accompanying drawings, in which:

Figs. 3 and 4 are a side view and end view, respectively, of one of said resilient elements.

Fig. 5 is a fragmental axial section of one of the resilient elements and illustrates a preferred form of the novel shapes of the marginal portion of the sheet metal disc and the adjoining portion of the rubber block at one of its ends.

For comparison Fig. 6 shows in the same way as Fig. 5 a hitherto customary design of the marginal portion of the sheet metal disc and the adjoining rubber at each end of the rubber block.

Figure 1:
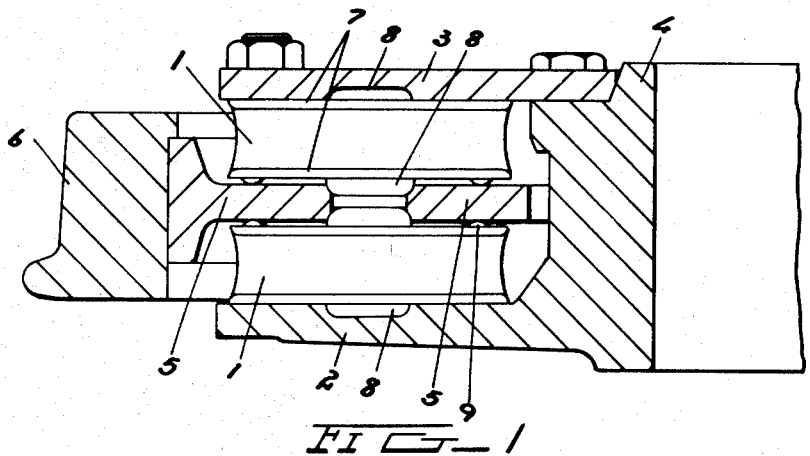
Fig. 1 is a fragmental axial section of a resilient railway vehicle wheel comprising rubber blocks distributed around the wheel hub and clamped as resilient elements between relatively movable parts of the wheel.
Figure 2:
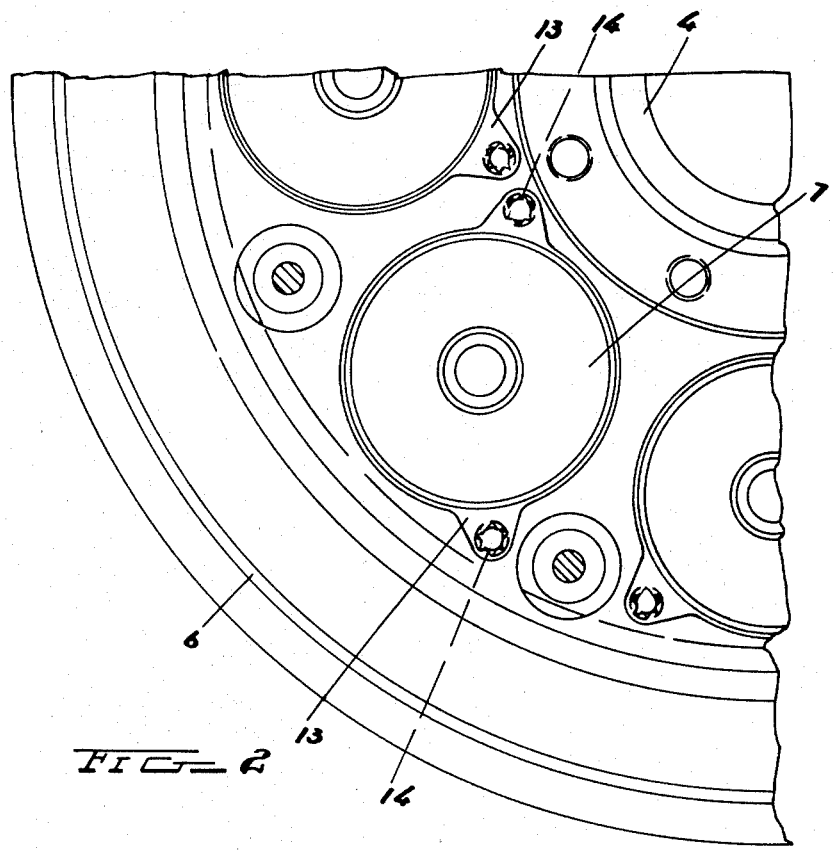
Fig. 2 is a fragmental elevation of part of the wheel shown in Fig. 1.

The wheel shown in Figs. 1 and 2 for an exemplification of the use of the subject matter of invention is of the type in which rubber blocks 1 are clamped between two outwardly directed flanges 2 and 3 on the wheel hub 4 and an inwardly directed flange 5 on the wheel rim 6 for permitting resilient movements between the wheel hub and the wheel rim both axially and at right angles to the wheel axis as well as angularly about the wheel axis.

The rubber blocks 1 are of circular cross section and are covered on their end surfaces facing the flanges 2, 3 with sheet metal discs 7 which are vulcanized to said end surfaces and by means of which the rubber blocks bear against the flanges 2, 3, and 5 between which the rubber blocks are clamped. The sheet metal discs 7 are provided with central bosses 8 which engage in corresponding recesses in the flanges 2, 3, 5.

Furthermore the sheet metal discs 7 secured to the rubber blocks 1 on their end surfaces facing the flange 5 of the wheel rim 6 are provided with bosses 9 which are distributed along a circle and which serve as distance members for providing air cooling clearances between the sheet metal discs 7 in question and the flange 5 of the wheel rim 6. So far the construction of the wheel is conventional.

Fig. 6 shows an example of the design of the sheet metal discs 7 which has been most widely used up to now as regards the shape of the marginal portion of the disc and the shape of the adjoining portion of the rubber. According to this example the sheet metal disc 7 is shaped as a shallow cup having its concave sides facing the rubber to which the disc is adherently attached by vulcanization. In this known construction as well as in known constructions in which the sheet metal disc is flat or has a conical edge flange with the convex side facing the rubber, the edge of the surface between the rubber and the disc coincides more or less closely with a plane in which the rubber at the periphery of the rubber block is exposed to relatively large tensile stresses to which the rubber is sensitive. As a result thereof the rubber will rather soon be torn loose from the sheet metal disc at the edge of the adjoining end surface of the rubber block. Such a tearing loose of the rubber is the beginning of a deterioration of the rubber which then proceeds at an ever increasing speed.

Fig. 5 shows in a preferred form of the invention how this injurious phenomenon can be eliminated or essentially suppressed. The marginal portion of the sheet metal disc 7 is of such a shape that in axial section the surface thereof to which the rubber is adherently attached, is convexedly curved with not too small a radius of curvature, the centre of curvature lying inside the periphery of the adjoining end surface of the rubber block 1. In the preferred form shown in Fig. 5, the disc 7 is provided at its marginal portion with a pressed annular ridge 11 on the side facing the rubber vulcanized to the disc, and this annular ridge 11 not only provides the convexedly curved shape in axial section of the marginal portion of the interface between the rubber and the disc 7 as shown, but also takes up a great part of the shearing stresses arising in the rubber adjacent the interface between the rubber and the metal disc, and essentially relieves the marginal portion 10 of the rubber from such stresses. As will be seen from Fig. 5, the marginal portion 10 of the rubber gradually decreases in thickness wholly or substantially to nothing towards the edge or periphery of the interface between the rubber block and the attached metal disc 7, and due to the fact that said portion 10 encloses, especially at its edge, the projecting ridge 11, said portion 10 and especially the edge thereof will not be exposed to any appreciable tensile stresses. Consequently there does not occur any tendency of the rubber being torn loose from the sheet metal disc at the edge of the rubber block end surface vulcanized to said sheet metal disc.

The shape of the marginal portion of the sheet metal disc 7 shown in Fig. 5 is advantageous not only for the principal purposes of the invention but also for reasons of saving material inasmuch as the pressed annular ridge 11 results in a stiffening of the sheet metal disc thus permitting its construction of thinner sheet metal than otherwise. With the shape given the sheet metal disc 7 by the pressed annular ridge 11 it is moreover extremely easy to provide a pair of integral lugs 13 (Figs. 3 and 4) on the sheet metal disc simultaneously as this is pressed. These lugs serve the purpose of retaining said sheet metal disc with the aid of a pair of securing bolts 14 (Fig. 2) passed through said lugs. Earlier many proposals have been made—without any satisfactory results however—for bringing about an efficient and safe retention of the sheet metal disc 7 to prevent rotation and other movements thereof in relation to the parts (flanges 2, 3, 5) between which the rubber blocks are clamped. With the aid of the lugs 13 the retention is realized in a simple and very efficient manner.

What I claim and desire to secure by Letters Patent is:

In a resilient wheel, resilient shaft coupling or the like having an axis to rotate about during service and comprising parts relatively movable about said axis and longitudinally thereof and perpendicularly thereto, resilient rubber blocks disposed around said axis and clamped in axially compressed state between said relatively movable parts so as to be subjected to shearing stresses in planes perpendicular to said axis during service, and sheet metal plates covering and adhering to the faces of said rubber blocks facing said relatively movable parts for safeguarding the rubber of said rubber blocks from contact with and ensuing rubbing against said relatively movable parts, the combination comprising any one of said sheet metal plates being formed on its side facing and adhering to the respective rubber block with a ridge extending adjacent and along the periphery of said side of the plate, the face of said ridge facing and adhering to the respective rubber block having in cross section of said ridge a smoothly rounded convex shape, the respective rubber block being formed with an integral annular portion surrounding said ridge and forming close to the periphery of said side of the plate a thin edge spaced by means of the plate from the adjacent one of said relatively movable parts between which said rubber blocks are clamped, and said annular portion being of a thickness and of an inner diameter increasing and decreasing, respectively, from said thin edge gradually toward the middle of the respective rubber block.

References Cited in the file of this patent

UNITED STATES PATENTS

| | | |
|---|---|---|
| 1,735,982 | Short | Nov. 19, 1929 |
| 1,794,780 | Leipert | Mar. 3, 1931 |
| 2,201,531 | Geb | May 21, 1940 |
| 2,511,279 | Malmquist | June 13, 1950 |
| 2,633,008 | Tocci-Guilbert | Mar. 31, 1953 |